(12) United States Patent
Sasaki

(10) Patent No.: US 12,535,319 B2
(45) Date of Patent: Jan. 27, 2026

(54) SURVEYING APPARATUS, SURVEYING METHOD, AND SURVEYING PROGRAM

(71) Applicant: TOPCON CORPORATION, Tokyo (JP)

(72) Inventor: You Sasaki, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 801 days.

(21) Appl. No.: 17/933,459

(22) Filed: Sep. 19, 2022

(65) Prior Publication Data

US 2023/0094618 A1    Mar. 30, 2023

(30) Foreign Application Priority Data

Sep. 24, 2021 (JP) ................. 2021-155335

(51) Int. Cl.
*G01C 15/00* (2006.01)
*G01C 15/06* (2006.01)

(52) U.S. Cl.
CPC .......... *G01C 15/006* (2013.01); *G01C 15/06* (2013.01)

(58) Field of Classification Search
CPC ..... G01C 15/006; G01C 15/06; G01C 15/002
USPC ...................................................... 356/4.08
See application file for complete search history.

(56) References Cited

U.S. PATENT DOCUMENTS

| 2012/0224164 A1 | 9/2012 | Hayashi et al. |
| 2016/0327647 A1 | 11/2016 | Herbst et al. |
| 2019/0227173 A1 | 7/2019 | Nishita |

FOREIGN PATENT DOCUMENTS

| EP | 3514489 A1 | 7/2019 |
| JP | 2019-128196 A | 8/2019 |

OTHER PUBLICATIONS

Extended European Search Report mailed Feb. 17, 2023 in connection with EuropeanPatent Application No. 22193820.2, 8 pgs.

*Primary Examiner* — Daniel L Murphy
(74) *Attorney, Agent, or Firm* — Chiesa Shahinian & Giantomasi PC

(57) ABSTRACT

A technique for enabling efficient surveying operation that uses a light-reflecting target is provided. A surveying apparatus is configured to survey a reflecting prism and includes a controller, a surface calculator, and a position calculator. The controller performs positioning on three or more points on the set-up surface on which the reflecting prism is set up, by using laser light. The surface calculator calculates a plane of the set-up surface based on the positioning data of the three or more points in a case in which the position of the reflecting prism is surrounded by the three or more points in terms of a horizontal plane. The position calculator calculates a point of intersection of the plane and a straight line from the position of the reflecting prism to the plane, as a position on the set-up surface, at which the reflecting prism is set up.

10 Claims, 5 Drawing Sheets

SURVEYING APPARATUS, SURVEYING METHOD, AND SURVEYING PROGRAM

CROSS-REFERENCE TO RELATED APPLICATIONS

This application claims priority from Japanese Patent Application No. 2021-155335, filed Sep. 24, 2021; the disclosure of which is incorporated herein by reference in its entirety.

TECHNICAL FIELD

The present invention relates to a technique for surveying using a reflecting target.

BACKGROUND

A point that is indicated in a drawing is identified at a construction site. This operation uses a surveying apparatus, such as a total station (TS), to identify the point that is indicated by data, at the actual site. A marker may be set at the identified point, or a pile may be driven at the identified point. In addition, the position at which a marker is set or at which a pile is driven, may be measured at the actual site.

These operations use a light-reflecting target, such as a reflecting prism device. For example, a reflecting prism device is constructed by fixing a reflecting prism on a pole. In the operations, a tip end of the pole is brought into contact with a point at which the position is to be measured (called a "survey setting point"), on a ground surface or on a floor, and in this state, a surveying apparatus measures the position of the reflecting prism by using laser light.

Final required values of positioning are coordinates of the survey setting point on the ground surface or the floor surface, which is in contact with the tip end of the pole. From this point of view, the position of the reflecting prism on the pole must be accurately obtained in advance. This work is complicated and is not efficient. In addition, incorrect values are obtained in some cases.

A technique that dispenses with the above-described work is disclosed in Japanese Unexamined Patent Application Publication No. 2019-128196. With the use of this technique, a position on a ground surface immediately below a reflecting prism is determined by laser scanning.

The method that is disclosed in Japanese Unexamined Patent Application Publication No. 2019-128196 is based on an assumption that laser scanning is performed along a vertical plane. However, in actual cases, laser scanning is performed by rotating an optical system in a horizontal plane while the optical system vertically rotates, and therefore, laser scanning is performed along a slightly slanted line. This can cause an error in obtaining coordinates of a point vertically immediately below a reflecting prism.

SUMMARY

In view of these circumstances, an object of the present invention is to provide a technique for enabling efficient surveying operation that uses a light-reflecting target.

The present invention provides a surveying apparatus configured to survey a light-reflecting target that is set up on a set-up surface at a position separated from the set-up surface by a predetermined distance. The surveying apparatus includes a processor or circuitry configured to receive positioning data of the light-reflecting target, which is measured by using laser light, and perform positioning on three or more points on the set-up surface on which the light-reflecting target is set up, by using the laser light. The processor or circuitry is further configured to determine whether the position of the light-reflecting target is surrounded by the three or more points, in terms of coordinates in a horizontal direction. The processor or circuitry is further configured to calculate a plane of the set-up surface based on the positioning data of the three or more points, in a case in which the three or more points surround the position of the light-reflecting target in terms of coordinates in the horizontal direction, and calculate a point of intersection of the plane and a straight line from the position of the light-reflecting target to the plane, as a position on the set-up surface, at which the light-reflecting target is set up.

In one aspect of the present invention, the light-reflecting target may be supported by a straight member, and the straight line may be calculated based on result of laser scanning performed on the straight member. In one aspect of the present invention, in a case in which the three or more points do not surround the position of the light-reflecting target in terms of coordinates in the horizontal direction, positioning using the laser light may be performed on three or more other points on the set-up surface on which the light-reflecting target is set up, based on differences between positions in a height direction of the three or more points and a position in a height direction of the light-reflecting target.

In one aspect of the present invention, in a case in which the three or more points do not surround the position of the light-reflecting target in terms of coordinates in the horizontal direction, positioning using the laser light may be performed on three or more other points on the set-up surface on which the light-reflecting target is set up, based on relationships between positions in a horizontal direction of the three or more points and a position in a horizontal direction of the light-reflecting target.

In one aspect of the present invention, multiple points P1 to Pi, in which "i" is a natural number of three or more, may be obtained as a result of performing positioning using the laser light on the three or more points on the set-up surface on which the light-reflecting target is set up. In this case, a distribution of positions in the height direction of the multiple points P1 to Pi may be calculated, and a point at a position having a height deviated from the distribution may be removed from among the multiple points P1 to Pi.

In one aspect of the present invention, multiple points P1 to Pi, in which "i" is a natural number of three or more, may be obtained as a result of performing positioning using the laser light on the three or more points on the set-up surface on which the light-reflecting target is set up. In this case, a point that is not appropriate for use in the determination may be removed as an abnormal point from among the multiple points P1 to Pi, by comparing a distribution of positions of the multiple points P1 to Pi that are expected in a certain horizontal plane, with a distribution of positions of the multiple points P1 to Pi obtained as a result of the positioning, or by comparing measured distance values of the multiple points P1 to Pi that are expected in a certain horizontal plane, with measured distance values of the multiple points P1 to Pi obtained as a result of the positioning.

In one aspect of the present invention, in performing laser scanning on a lower side of the light-reflecting target, a part of a head of a pile that is driven into the set-up surface may be measured.

The present invention also provides a surveying method for surveying a light-reflecting target that is set up on a set-up surface at a position separated from the set-up surface by a predetermined distance. The method includes receiving positioning data of the light-reflecting target, which is measured by using laser light, and performing positioning on three or more points on the set-up surface on which the light-reflecting target is set up, by using the laser light. The method also includes determining whether the position of the light-reflecting target is surrounded by the three or more points, in terms of a horizontal direction. The method further includes calculating a plane of the set-up surface based on the positioning data of the three or more points, in a case in which the three or more points surround the position of the light-reflecting target in terms of the horizontal direction, and calculating a point of intersection of the plane and a straight line from the position of the light-reflecting target to the plane, as a position on the set-up surface, at which the light-reflecting target is set up.

The present invention also provides a non-transitory computer recording medium storing computer executable instructions for performing processing related to surveying of a light-reflecting target that is set up on a set-up surface at a position separated from the set-up surface by a predetermined distance. The computer executable instructions are made to, when executed by a computer processor, cause the computer processor to receive positioning data of the light-reflecting target, which is measured by using laser light, and perform positioning on three or more points on the set-up surface on which the light-reflecting target is set up, by using the laser light. The computer executable instructions are also made to, when executed by a computer processor, cause the computer processor to determine whether the position of the light-reflecting target is surrounded by the three or more points, in terms of a horizontal direction, calculate a plane of the set-up surface based on the positioning data of the three or more points, in a case in which the three or more points surround the position of the light-reflecting target in terms of the horizontal direction, and calculate a point of intersection of the plane and a straight line from the position of the light-reflecting target to the plane, as a position on the set-up surface, at which the light-reflecting target is set up.

The present invention enables efficient surveying operation that uses a light-reflecting target.

DETAILED DESCRIPTION

1. First Embodiment (Overview)

Figure 1:
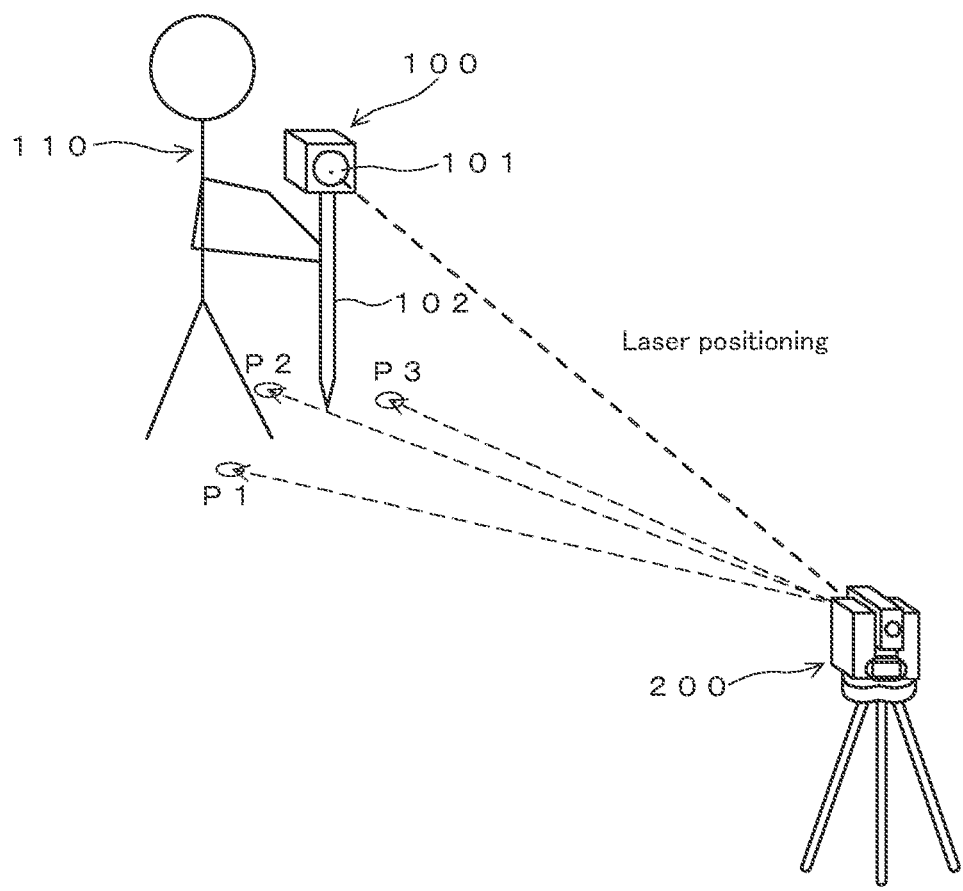
FIG. 1 is a schematic diagram of an embodiment.

FIG. 1 shows a surveying apparatus 200, a reflecting prism device 100, and a worker 110. The surveying apparatus 200 measures a position (performs positioning) by using laser light. The reflecting prism device 100 is a light-reflecting target to be positioned by the surveying apparatus 200. The worker 110 sets up and holds the reflecting prism device 100.

The reflecting prism device 100 has an elongated rod-shaped pole 102 and a reflecting prism 101 that is fixed on the pole 102. The bottom end of the pole is pointed. The pole 102 is stood vertically in a condition in which the pointed bottom of the pole 102 is brought into contact with a survey setting point on a ground surface or a floor surface, whereby the reflecting prism device 100 is set up at the survey setting point.

The surveying apparatus 200 uses laser light to measure a position of (perform positioning on) the reflecting prism 101 of the reflecting prism device 100 and perform positioning on a ground surface on which the reflecting prism 101 is set up. This positioning for the ground surface is performed by measuring light that is reflected back from the ground surface, that is, this positioning is not a prism measurement and does not use a reflecting prism. Then, arithmetic calculation, which will be described later, is performed to calculate coordinates of the point (survey setting point) on the ground surface, which is in contact with the pointed bottom of the pole 102.

Specifically, first, the position of the reflecting prism 101 is measured by the surveying apparatus 200. Then, positions of three or more points P1 to Pi (i=3, 4, 5, 6, ...) on a ground surface at which the reflecting prism device 100 is set up, are measured by the surveying apparatus 200. At this time, the points P1 to Pi are selected so as to surround the survey setting point.

Next, a plane of the ground surface on which the reflecting prism device 100 is set up is calculated by using the points P1 to Pi. Specifically, a plane equation that mathematically describes the plane of the ground surface is calculated. Then, a position at which this plane and an extension of the pole 102 cross each other, or a position at which this plane and a vertical line passing through the reflecting prism 101 cross each other, is calculated as the survey setting point.

Surveying Apparatus

Figure 2A:
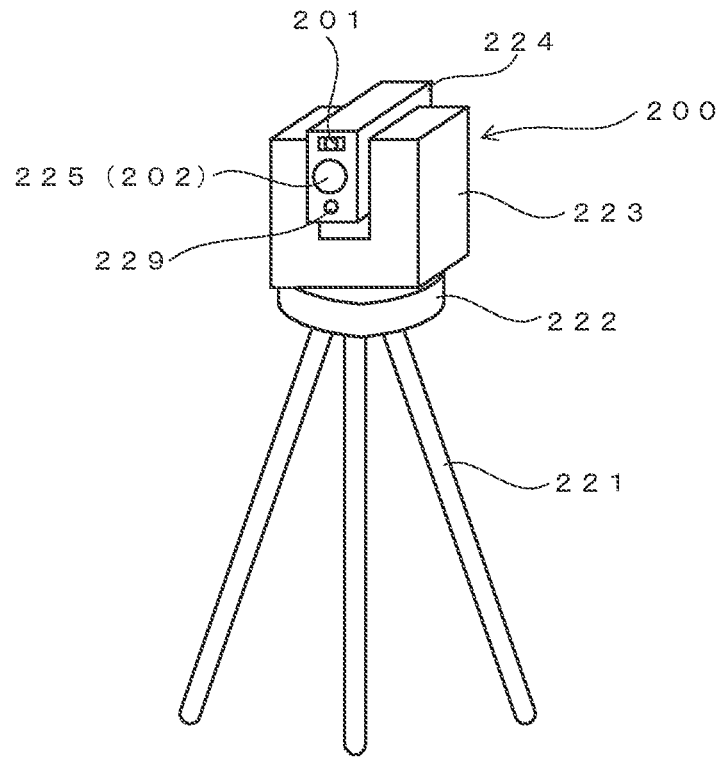
FIGS. 2A and 2B show an external appearance of a surveying apparatus.
Figure 2B:
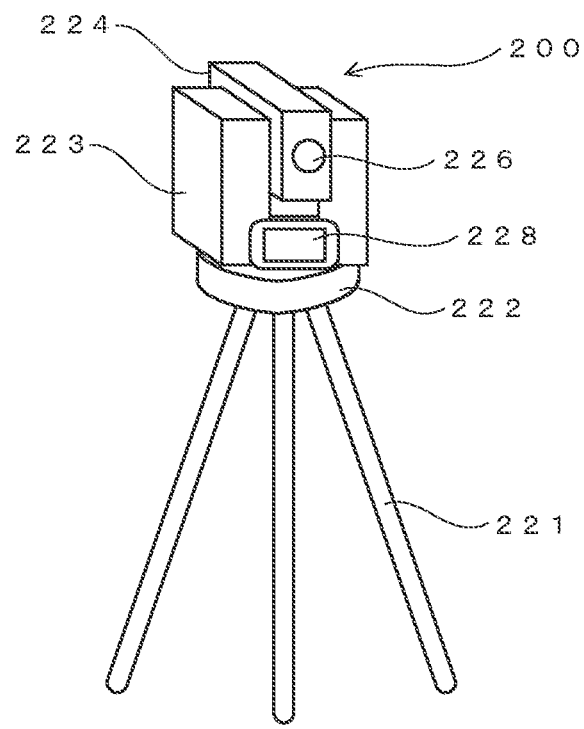

The surveying apparatus 200 is a total station and has a function of measuring a distance and a position, and a function of capturing and tracking a target to be surveyed, by using laser light. FIGS. 2A and 2B are perspective views of the surveying apparatus 200. FIG. 2A is a front perspective view, and FIG. 2B is a rear perspective view.

The surveying apparatus 200 includes a base 222 that is fixed on a tripod 221, a horizontal rotation unit 223 that is horizontally rotatable on the base 222, and a vertical rotation unit 224 that is held by the horizontal rotation unit 223, in a state of being vertically rotatable (being controllable in elevation angle and depression angle).

Horizontal rotation and vertical rotation are performed by motors. Each of the horizontal angle of the horizontal rotation unit 223 (oriented direction in the horizontal direction of an optical axis of a telescope 225) and a vertical angle of the vertical rotation unit 224 (elevation angle or depression angle of the optical axis of the telescope 225) is accurately measured by an encoder.

The vertical rotation unit 224 includes a telescope 225, an optical unit 229 of laser light for capturing and tracking, and a wide-angle camera 201, on a front side thereof, and it includes an eyepiece 226 of the telescope 225 and a touch panel display 228, on a back side thereof. The telescope 225 also serves as an optical system of a telephoto lens camera 202 shown in FIG. 3.

The telescope 225 also has an objective lens through which distance measuring laser light for measuring a distance (distance measuring light) is emitted to the outside and through which the emitted light that is reflected back is received. That is, the optical axis of the telescope 225 (optical axis of the telephoto lens camera 202) and the optical axis of the distance measuring light are set on the same axial line. In addition, both of the optical axis of the wide-angle camera 201 and the optical axis of the optical unit 229 of the laser light for capturing and tracking are set in the same direction as the optical axis of the telescope 225.

The touch panel display 228 is an operation panel and a display of the surveying apparatus 200. The touch panel display 228 shows various information related to operation of the surveying apparatus 200 and information related to surveying result.

Block Diagram of Surveying Apparatus

Figure 3:
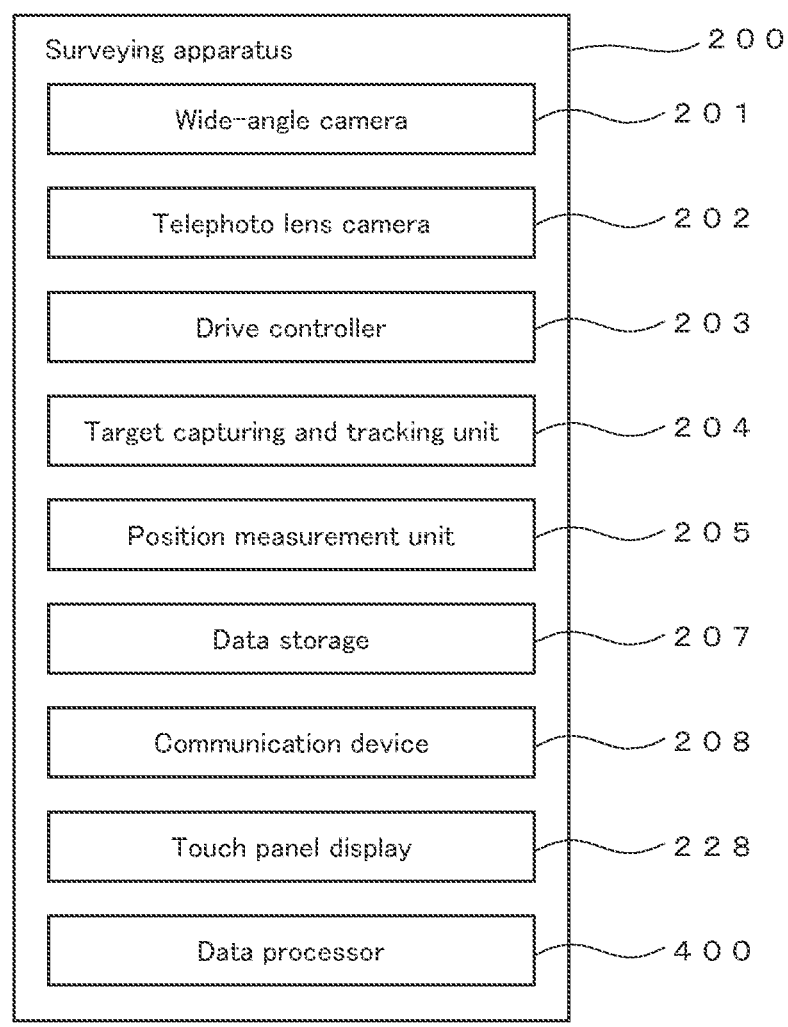
FIG. 3 is a block diagram of the surveying apparatus.

FIG. 3 is a functional block diagram of the surveying apparatus 200. The surveying apparatus 200 includes a wide-angle camera 201, a telephoto lens camera 202, a drive controller 203, a target capturing and tracking unit 204, a position measurement unit 205, a data storage 207, a communication device 208, a touch panel display 228, and a data processor 400.

The wide-angle camera 201 obtains wide-angle photographic images. The telephoto lens camera 202 obtains telephoto images. The drive controller 203 controls the direction of the optical axis of the surveying apparatus 200 (optical axis of the telescope 225). Specifically, the drive controller 203 controls horizontal rotation of the horizontal rotation unit 223 and vertical rotation of the vertical rotation unit 224.

The drive controller 203 controls the optical axis of positioning light that is used in the processes in steps S101, S102, and S105 in FIG. 5, which will be described later.

The target capturing and tracking unit 204 performs processes related to capturing and tracking of a target by using laser light for capturing and tracking. The target is a reflector, such as a reflecting prism. In this example, the reflecting prism 101 is used as the target.

The laser light for capturing and tracking has a fanning-out beam shape. The direction of the target is searched for by detecting this laser light that is reflected back from the target. At the time of searching, the direction of the optical axis of the surveying apparatus 200 is finely adjusted under control of the drive controller 203. Specifically, the optical axis is finely adjusted in such a manner as to swing vertically and horizontally, in searching for the target. Details of this technique are disclosed in, for example, Japanese Unexamined Patent Application Publication No. 2009-229192.

As a result of searching, the target is captured on the optical axis of the surveying apparatus 200 (optical axis of the telescope 225). This condition is the state of capturing the target. After the target is captured once, the optical axis of the surveying apparatus 200 is controlled in real time so as to maintain this state. This results in tracking of the target. Thus, even when the target moves, the direction of the optical axis is controlled following the direction of the target, whereby the state of capturing the target is maintained.

In the case of losing sight of the target in the state of having captured the target, searching for the target is started. In this manner, control is performed so as to maintain the state of capturing the target as much as possible.

The position measurement unit 205 measures a position by using laser light. In measurement of a position, a distance to an object (in this case, a reflecting prism being a target) measured by distance measuring light (laser light for measuring a distance), and a direction of the optical axis of the distance measuring light, are calculated. The distance is calculated by using the principle of electrooptical distance measurement. The distance can be calculated by a method using a phase difference or a propagation time of the distance-measuring light that is received. In this example, the distance is measured by the method using a phase difference.

In the method using a phase difference, a reference optical path is provided in a surveying apparatus, and a distance to an object is calculated from a difference (phase difference) between the timing of receiving the distance measuring light that has propagated through the reference optical path and the timing of receiving the distance measuring light that has reflected back from the object. In the method using a propagation time, a distance to an object is calculated from the time it takes for the distance-measuring light to reach the object and be reflected back.

The direction of a distance measurement point as seen from the surveying apparatus 200 (direction of the optical axis of the distance measuring light) is obtained by measuring a rotation angle of each of the horizontal rotation unit 223 and the vertical rotation unit 224. The rotation angle of each of the horizontal rotation unit 223 and the vertical rotation unit 224 is accurately measured by an encoder.

The data storage 207 stores data and programs necessary to operate the surveying apparatus 200 and data of results of surveying. The data processor 400 processes data related to the processes in FIG. 5, which will be described later.

Block Diagram of Data Processor

Figure 4:
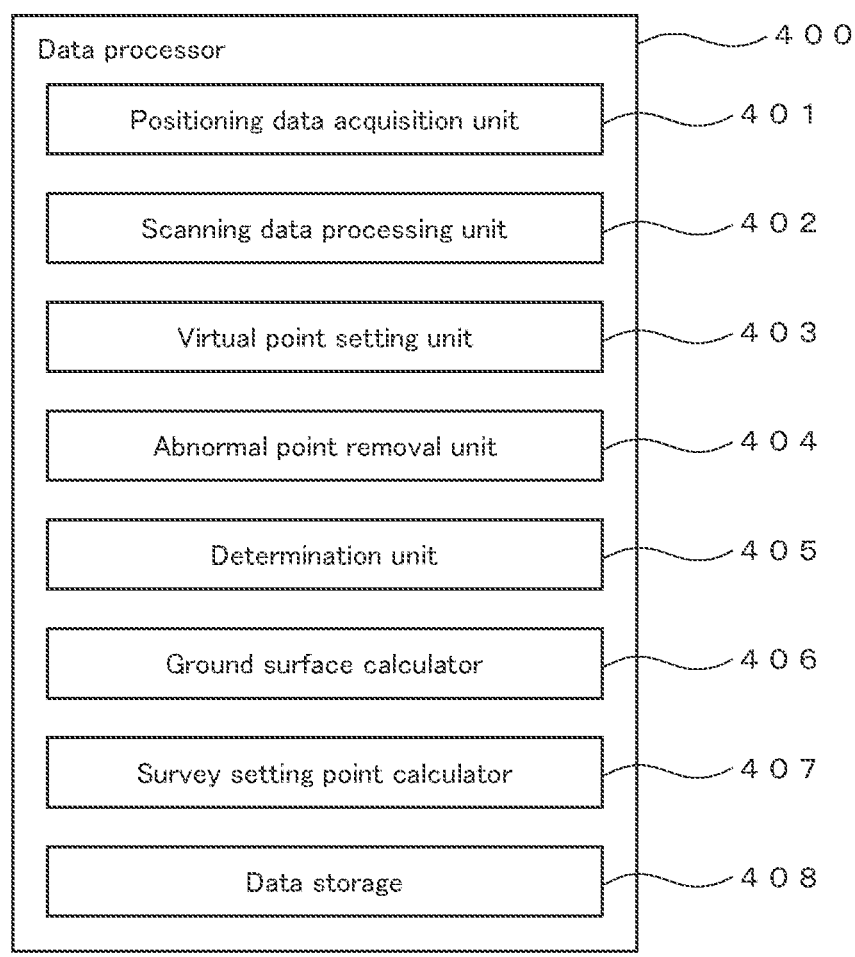
FIG. 4 is a block diagram of a data processor.

FIG. 4 shows a block diagram of the data processor 400. The data processor 400 is a built-in computer that includes a CPU, various arithmetic devices, a memory, and an interface. The data processor 400 may be constructed by using a general-purpose computer, such as a personal computer (PC).

Each functional unit that is shown in FIG. 4 of the data processor 400 is implemented by making the computer read and execute application software for implementing the corresponding function. At least one, or all, of the functional units shown in FIG. 4 may be implemented by dedicated hardware. At least one, or all, of the functions of the data processor 400 can also be implemented on a server that is connected to the Internet line.

The data processor 400 includes a positioning data acquisition unit 401, a scanning data processing unit 402, a virtual point setting unit 403, an abnormal point removal unit 404, a determination unit 405, a ground surface calculator 406, a survey setting point calculator 407, and a data storage 408.

The positioning data acquisition unit 401 performs the process in step S101, which will be described later. This process acquires positioning data that is obtained by the surveying apparatus 200.

The scanning data processing unit 402 processes scanning data that is obtained in laser scanning performed by the surveying apparatus 200. The scanning data processing unit 402 performs the process in step S103 in FIG. 5.

Figure 5:
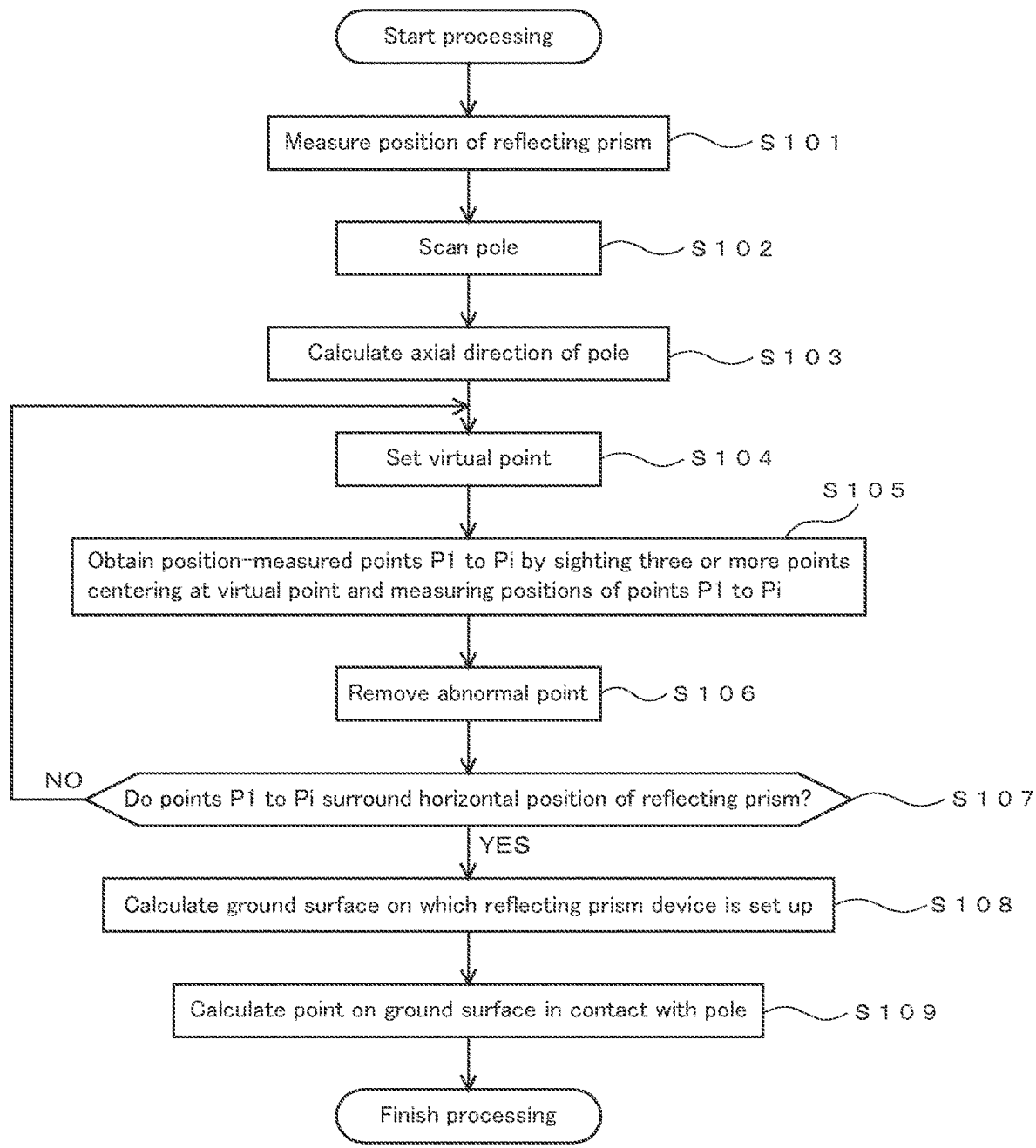
FIG. 5 is a flowchart showing an example of a processing procedure.

The virtual point setting unit 403 performs the process in step S104 in FIG. 5. The abnormal point removal unit 404 performs the process in step S106 in FIG. 5. The determination unit 405 performs the process in step S107 in FIG. 5. The ground surface calculator 406 performs the process in step S108 in FIG. 5. The survey setting point calculator 407 performs the process in step S109 in FIG. 5. The data storage 408 stores data and operation programs necessary to operate the data processor 400, data processed by the data processor 400, etc.

Example of Processing Procedure

FIG. 5 is a flowchart showing a procedure of processing performed by the data processor 400. The program for executing the processing in FIG. 5 is stored in an appropriate storage medium and is executed by the CPU of the computer that constitutes the data processor 400. The program for executing the processing in FIG. 5 may be stored in a server and may be downloaded for use.

Herein, it is assumed that the position of the reflecting prism 101 is measured by the surveying apparatus 200, in the condition in which the reflecting prism device 100 is held by worker 110 and in which the pointed bottom of the pole 102 is in contact with a point (survey setting point) to be positioned on a ground surface (refer to FIG. 1).

In the state prior to operation, a distance H0 from the pointed bottom of the pole 102 to the center of the reflecting prism 101, that is, a height H0 from the ground surface of the reflecting prism 101 of the pole 102 that vertically stands on the ground surface, is unknown. Of course, an approximate value of the height H0 from the ground surface may be already known. Herein, it is assumed that a user performs operations without paying attention to the value of H0.

Under these conditions, processing is started. After the processing starts, first, the position of the reflecting prism 101 is measured by the surveying apparatus 200 (step S101). This positioning is performed by the laser positioning function of the surveying apparatus 200. This process is the same as that for ordinary positioning of a reflecting prism.

Then, laser scanning is performed on the pole 102 of the reflecting prism device 100 (step S102). The laser scanning of the pole 102 uses the laser scanning function of the surveying apparatus 200. This laser scanning is performed by moving the optical axis of the surveying apparatus 200 and emitting laser distance measuring light (laser positioning light) in a spot-like manner.

The laser scanning with respect to the pole 102 is performed in a range centering at a part vertical downward of the center of the reflecting prism 101. For example, laser scanning is performed in a range of a fan shape that opens downward from an apex at the center of the reflecting prism 101. The apex angle at the apex of the fan shape is, for example, 15 degrees.

At this time, a telephoto image that is obtained via the telescope 225 may be used. The optical axes of the laser distance measuring light and the telescope 225 are on the same line, and the center of the photographic image obtained by the telephoto lens camera 202 is a distance measurement point. With the use of this principle, the pole 102 is detected in the telephoto image by image recognition, and the laser scanning is performed by sighting the detected pole 102.

For example, an extension direction of the pole 102 is detected in a telephoto image that is obtained by the telephoto lens camera 202, and the laser scanning is performed by sighting the center of the telephoto image along an extension line of the extension direction of the pole 102.

This process is automatically performed by using an image recognition technique. Of course, a user who operates the surveying apparatus 200 may perform manual sighting.

After step S102 is performed, the processing advances to step S103. In step S103, the axial direction of the pole 102 is calculated based on the laser scanning data that is obtained in step S102.

In step S102, a laser-scanned point cloud of multiple points that are measured as data of the pole 102, is obtained. This laser-scanned point cloud shows a distribution of points that are positioned linearly along the pole 102, in a spot-like manner. A straight line that fits to this laser-scanned point cloud of the pole 102 is obtained, and an extending direction of the straight line is calculated. This process is performed in step S103.

After step S103 is performed, the processing advances to step S104. In step S104, a point in contact with the pole 102 of the reflecting prism device 100, on the ground surface, is assumed to be a virtual point.

In this process, first, a position P0=(X1, Y1, Z1) that is measured in step S101, is acquired. Next, temporarily assuming that a height H0 from the ground surface of the reflecting prism 101 is 1 meter, a position (X1, Y1, Z1−1 meter) is set as a virtual point (step S104). The position of this virtual point is of a point at which the pole 102 is assumed to be in contact with the ground surface. Thus, existence of the ground surface at the virtual point is not ensured. Note that the temporarily set value of H0 may be another value, such as 1.5 meters, on the condition that the value is practical.

Thereafter, three or more multiple points that surround the virtual point in step S104 at the center, on a horizontal plane, are set. Then, laser positioning is performed by sighting these set multiples points. This positioning provides multiple position-measured points P1 to Pi (i is a natural number of three or more) (step S105).

The three or more multiple points on the horizontal plane, which surround the virtual point, are selected in a range of a circle of 1 meter radius centering at the virtual point. The three or more multiple points, which surround the virtual point, are temporarily set points assuming that reflection points exist thereat, and therefore, reflection from these points is not ensured. Thus, the sighted point and the point Pi may not coincide with each other.

The multiple points P1 to Pi exist anywhere on lines connecting the optical origin of the surveying apparatus 200 and the sighted points (three or more points surrounding the virtual point). However, as described above, they may not exist at the initially temporarily set positions.

Next, an abnormal point is removed (step S106). The abnormal point is selected from among the obtained multiple points P1 to Pi, as a point at which the value in the height direction (Z direction) differs by a threshold or greater. Specifically, a distribution of the multiple points P1 to Pi in the height direction is calculated, and a point that is separated upward by a threshold or greater is removed as an abnormal value.

In a case in which positioning light is reflected by worker 110, who holds the pole 102, the position in the Z direction of a reflection point that reflects the positioning light is separated from the reflection point (position-measured point) on the ground surface. This principle is used to remove positioning light that is reflected back from the worker 110.

For example, five points P1 to P5 are set as the points P1 to Pi, and the points P1 to P4 are distributed in a range of ±1 cm or less, whereas a Z value of the point P5 is greater than an average of Z values of the points P1 to P4 by 6 cm. In this case, the point P5 is likely to be a reflection point such as on a leg of worker 110, and it is determined as being an abnormal point.

In one example, in consideration of a distribution of Z values, three times of a range of variations of a main group is used as a threshold, and a point having a Z value that is deviated by the threshold or greater is determined as being an abnormal point.

On the other hand, an abnormal point can also be detected as follows. A distribution of horizontal positions of the points P1 to Pi that are initially sighted (distribution of (X, Y) coordinate values of each point in the horizontal plane containing the virtual point) is compared with a distribution of horizontal positions of the actually obtained points P1 to Pi. On the condition that reflection from the ground surface is obtained, these two kinds of points have similar distributions, although they are different from each other in variation in scale and in distortion to some degree.

However, when there is reflection from an object other than the ground surface (e.g., reflection from a leg of worker 110), the horizontal position of the reflection point is deviated from the distribution of the horizontal positions of the points P1 to Pi that are initially sighted. That is, a relative positional relationship between this reflection point and other points is different from a relative positional relationship between a reflection point on the ground surface and other points. The degree of this difference is calculated, and a point having a difference of a threshold or greater is regarded as an abnormal point.

For example, a reflection point on a leg of worker 110 provides a short-measured distance value, compared with a case in which the reflection point is not on the leg of worker 110. Specifically, for example, it is assumed that, among five measured points P1 to P5, the points P1 to P4 are reflection points on the ground surface, and the measured distance value of each of the points P1 to P4 is approximately "A" mm greater than a measured distance value that is initially expected based on the virtual point. On the other hand, the point P5 is assumed to originate from a reflection from the worker 110. In this case, the measured distance value of the point P5 is short compared with a point that does not originate from the leg (because the leg is on a side closer to the surveying apparatus 200). As a result, only the measured distance value of the point P5 is (A–B) mm. The value of "B" is determined, whereby the point P5 is detected as an abnormal point.

Next, whether there is the point P0 at a position surrounded by the remaining multiple points P1 to Pi excluding the abnormal point, is determined in terms of a position in the horizontal direction (X-Y coordinates) (step S107). In one example, there are three points P1, P2, and P3 as the points P1 to Pi. In this case, the Z value is not considered, but the X-Y coordinates are used to determine whether the point P0 is surrounded by the points P1, P2, and P3. Specifically, the points P0, P1, P2, and P3 are projected on a horizontal plane, and it is determined whether the point P0 is surrounded by the points P1, P2, and P3 in this plane of projection.

In a case in which the point P0 exists at a position surrounded by the multiple points P1 to Pi, in terms of the horizontal direction, the processing advances to step S108. Otherwise, the processes in step S104 and the subsequent steps are performed again. The processes in step S104 and the subsequent steps are performed a second time by setting the height H0 from the ground surface of the reflecting prism 101 as follows.

An average Za of the Z values of the remaining points P1 to Pi excluding the abnormal point is assumed as a position on the ground surface, and H0 is set again as H0=Z1−Za. In this state, step S104 and the subsequent steps are repeated.

Alternatively, the following method may be performed. First, a position of a geometric center of a horizontal plane of the remaining points P1 to Pi excluding the abnormal point is calculated. In a case in which the calculated position of the geometric center is farther than the virtual point that is set in step S104, as seen from the surveying apparatus 200, the value of H0 is set to be greater than before. On the other hand, in a case in which the calculated position of the geometric center is close to the surveying apparatus 200 more than the virtual point that is set in step S104, the value of H0 is set to be less than before.

In one example, the calculated position of the geometric center may be farther than the virtual point, as seen from the surveying apparatus 200, in the condition in which H0=1 meter, at the first time. In this case, H0 is set to 1.5 meters, and the processes in step S104 and the subsequent steps are performed second time.

In a case in which an actual height from the ground surface of the reflecting prism 101 is greater than the assumed value of H0, the virtual point is set at a position above the ground surface. Thus, the horizontal positions of the points P1 to Pi are distant as seen from the surveying apparatus 200. That is, the position of the geometric center of the points P1 to Pi is farther than the horizontal position of the reflecting prism 101, as seen from the surveying apparatus 200. In this case, the value of H0 is set to be greater than before in step S104, whereby the value of the geometric center of the points P1 to Pi is made close to the horizontal position of the reflecting prism 101.

In a case in which an actual height from the ground surface of the reflecting prism 101 is less than the assumed value of H0, the tendency is opposite to that described above.

In a case in which the determination in step S107 results in YES, the ground surface on which the reflecting prism device 100 is set up is calculated (step S108). This process calculates an equation of a plane that fits to the remaining multiple points P1 to Pi, which are obtained in step S105 and from which the abnormal point is removed in step S106. The plane that is represented by this plane equation is obtained as the ground surface on which the reflecting prism device 100 is set up.

Thereafter, coordinates of a point in contact with the pole 102 on the ground surface are calculated (step S109). This process calculates coordinates of a point of intersection of a straight line that is an extension of the direction calculated in step S103, and the plane that is calculated in step S108. The calculated coordinates of the point of intersection are coordinates of the survey setting point.

Advantageous Effects

This technique dispenses with the need for preliminarily setting accurate numerical values related to the position of a target of a target device (reflecting prism device 100) prior to laser surveying using a reflector. In addition, even if the target device is tilted, it is possible to accurately obtain coordinates of a survey setting point. This reduces workload related to handling of the target.

2. Second Embodiment

The laser scanning in step S102 may be further performed to a lower side. In this case, scanning light subsequently reaches the pointed bottom of the pole 102, and then, laser scanning is performed on the ground surface. At this time, the position that is subjected to scanning is changed at a certain point, to a position in the horizontal direction. This certain point is set as the virtual point in step S104. The processes in step S105 and the subsequent steps are the same as those in the first embodiment.

3. Third Embodiment

Figure 6:
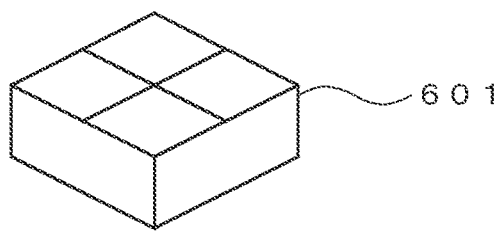
FIG. 6 shows an external appearance of a part of a head of a pile.

There may be cases in which a pile is already driven at the survey setting point and a head (pile head) 601 of the pile is viewed, as shown in FIG. 6. In a survey setting point determination operation, the reflecting prism device 100 is made to stand in the condition in which the pointed bottom of the pole 102 thereof is in contact with the center of the pile head, and positioning of the reflecting prism 101 is performed by the surveying apparatus 200.

The pile head 601 may be measured in laser scanning in step S102, and the measured position may be set as the virtual point in step S104.

4. Fourth Embodiment

For the reflecting prism device 100 that is vertically set up, that is, for the pole 102 that is vertically set up, the processes in steps S102 and S103 can be skipped. For example, the processes in steps S102 and S103 can be skipped with respect to a reflecting prism device having a structure of vertically maintaining the pole 102 by a gimbal mechanism or a structure of urging to maintain a vertical state by using an electronic level.

On the other hand, some reflecting prism devices are set up so that a reflecting prism will be positioned on a vertical straight line passing through a survey setting point that is marked vertically immediately below the reflecting prism by laser light. Also, in this case, the reflecting prism and the survey setting point are on a vertical straight line, and therefore, the processes in steps S102 and S103 can be skipped.

5. Fifth Embodiment

In step S107, a point Pi (Xi, Yi) that is at a position sufficiently close to a prism position P0 (X0, Y0) (at a position separated from the prism position P0 by a predetermined threshold or less), without considering the Z value, may be set as the survey setting point. In one example, in a case in which a desired accuracy is 3 cm, the threshold is set to 3 cm. Assuming that positions of points P1, P2, and P3 are measured as the points P1 to Pi, the point P1 may be closest to the point P0 and may be separated therefrom by 2 cm, in terms of X-Y coordinates. In this case, the coordinates of the point P1 are obtained as coordinates of the survey setting point.

6. Other Matters

The surveying apparatus is not limited to the total station as shown in FIGS. 2A and 2B and can be a laser scanner or a total station mounted with a laser scanner, which can be usable as a laser positioning apparatus. Instead of or in addition to the reflecting prism, a reflector that is retroreflective can also be used as the target. A field in which surveying is to be conducted is not limited to a ground surface and may be a floor surface in a building or in a facility.

What is claimed is:

1. A surveying apparatus configured to survey a light-reflecting target that is set up on a set-up surface at a position separated from the set-up surface by a predetermined distance, the surveying apparatus comprising a processor or circuitry configured to:
   receive positioning data of the light-reflecting target, which is measured by using laser light;
   perform positioning on three or more points on the set-up surface on which the light-reflecting target is set up, by using the laser light;
   determine whether the position of the light-reflecting target is surrounded by the three or more points, in terms of coordinates in a horizontal direction;
   calculate a plane of the set-up surface based on the positioning data of the three or more points, in a case in which the three or more points surround the position of the light-reflecting target in terms of coordinates in the horizontal direction; and
   calculate a point of intersection of the plane and a straight line from the position of the light-reflecting target to the plane, as a position on the set-up surface, at which the light-reflecting target is set up.

2. The surveying apparatus according to claim 1, wherein the light-reflecting target is supported by a straight member, and the straight line is calculated based on result of laser scanning performed on the straight member.

3. The surveying apparatus according to claim 1, wherein the straight line is a vertical straight line.

4. The surveying apparatus according to claim 1, wherein, in a case in which the three or more points do not surround the position of the light-reflecting target in terms of coordinates in the horizontal direction, positioning using the laser light is performed on three or more other points on the set-up surface on which the light-reflecting target is set up, based on differences between positions in a height direction of the three or more points and a position in a height direction of the light-reflecting target.

5. The surveying apparatus according to claim 1, wherein, in a case in which the three or more points do not surround the position of the light-reflecting target in terms of coordinates in the horizontal direction, positioning using the laser light is performed on three or more other points on the set-up surface on which the light-reflecting target is set up, based on relationships between positions in a horizontal direction of the three or more points and a position in a horizontal direction of the light-reflecting target.

6. The surveying apparatus according to claim 1, wherein multiple points P1 to Pi, in which "i" is a natural number of three or more, are obtained as a result of performing positioning using the laser light on the three or more points on the set-up surface on which the light-reflecting target is set up, and
   a distribution of positions in a height direction of the multiple points P1 to Pi is calculated, and a point at a position having a height deviated from the distribution is removed from among the multiple points P1 to Pi.

7. The surveying apparatus according to claim 1, wherein multiple points P1 to Pi, in which "i" is a natural number of three or more, are obtained as a result of performing positioning using the laser light on the three or more points on the set-up surface on which the light-reflecting target is set up, and
   a point that is not appropriate for use in the determination is removed as an abnormal point from among the multiple points P1 to Pi, by comparing a distribution of positions of the multiple points P1 to Pi that are expected in a certain horizontal plane, with a distribution of positions of the multiple points P1 to Pi obtained as a result of the positioning, or by comparing measured distance values of the multiple points P1 to Pi that are expected in a certain horizontal plane, with measured distance values of the multiple points P1 to Pi obtained as a result of the positioning.

8. The surveying apparatus according to claim 1, wherein, in performing laser scanning on a lower side of the light-reflecting target, a part of a head of a pile that is driven into the set-up surface is measured.

9. A surveying method for surveying a light-reflecting target that is set up on a set-up surface at a position separated from the set-up surface by a predetermined distance, the method comprising:

receiving positioning data of the light-reflecting target, which is measured by using laser light;

performing positioning on three or more points on the set-up surface on which the light-reflecting target is set up, by using the laser light;

determining whether the position of the light-reflecting target is surrounded by the three or more points, in terms of a horizontal direction;

calculating a plane of the set-up surface based on the positioning data of the three or more points, in a case in which the three or more points surround the position of the light-reflecting target in terms of the horizontal direction; and calculating a point of intersection of the plane and a straight line from the position of the light-reflecting target to the plane, as a position on the set-up surface, at which the light-reflecting target is set up.

10. A non-transitory computer recording medium storing computer executable instructions for performing processing related to surveying of a light-reflecting target that is set up on a set-up surface at a position separated from the set-up surface by a predetermined distance, the computer executable instructions being made to, when executed by a computer processor, cause the computer processor to:

receive positioning data of the light-reflecting target, which is measured by using laser light;

perform positioning on three or more points on the set-up surface on which the light-reflecting target is set up, by using the laser light;

determine whether the position of the light-reflecting target is surrounded by the three or more points, in terms of a horizontal direction;

calculate a plane of the set-up surface based on the positioning data of the three or more points, in a case in which the three or more points surround the position of the light-reflecting target in terms of the horizontal direction; and calculate a point of intersection of the plane and a straight line from the position of the light-reflecting target to the plane, as a position on the set-up surface, at which the light-reflecting target is set up.

* * * * *